US012190744B2

(12) United States Patent
Fuselli et al.

(10) Patent No.: US 12,190,744 B2
(45) Date of Patent: Jan. 7, 2025

(54) SUBORBITAL SPACE TRAFFIC CONTROL SYSTEM WITH RADAR SYSTEM AND ADS-B RECEIVER

(71) Applicant: LEONARDO S.P.A., Rome (IT)

(72) Inventors: Manuel Fuselli, Rome (IT); Sandro Strappaveccia, Rome (IT)

(73) Assignee: LEONARDO S.P.A., Rome (IT)

( * ) Notice: Subject to any disclaimer, the term of this patent is extended or adjusted under 35 U.S.C. 154(b) by 385 days.

(21) Appl. No.: 17/297,416

(22) PCT Filed: Nov. 27, 2019

(86) PCT No.: PCT/IB2019/060247
§ 371 (c)(1),
(2) Date: May 26, 2021

(87) PCT Pub. No.: WO2020/110040
PCT Pub. Date: Jun. 4, 2020

(65) Prior Publication Data
US 2022/0036748 A1 Feb. 3, 2022

(30) Foreign Application Priority Data

Nov. 27, 2018 (EP) .................................. 18425087
Nov. 13, 2019 (IT) ........................ 102019000021105

(51) Int. Cl.
*G08G 5/04* (2006.01)
*B64G 1/24* (2006.01)
(Continued)

(52) U.S. Cl.
CPC ............ *G08G 5/045* (2013.01); *B64G 1/242* (2013.01); *B64G 3/00* (2013.01); *G01S 13/726* (2013.01);
(Continued)

(58) Field of Classification Search
CPC .... G08G 5/045; G08G 5/0008; G08G 5/0021; G08G 5/0043; G01S 13/933; G01S 13/726; B64G 1/242; B64G 3/00
See application file for complete search history.

(56) References Cited

U.S. PATENT DOCUMENTS 6,965,816 B2 * 11/2005 Walker .................. G08B 31/00
701/16
6,995,705 B2 * 2/2006 Bradford ............... G01S 7/4004
342/464
(Continued)

FOREIGN PATENT DOCUMENTS

CN 102042820 A 5/2011
CN 106507959 B 11/2011
(Continued)

OTHER PUBLICATIONS

J. A. Haimerl, B. Hudson, G. P. Fonder and D. K. Lee, "Overview of the large digital arrays of the space fence radar," 2016 IEEE International Symposium on Phased Array Systems and Technology (PAST), Waltham, MA, USA, 2016, pp. 1-8, doi: 10.1109/ARRAY. 2016.7832538.*
(Continued)

*Primary Examiner* — Luis A Martinez Borrero
(74) *Attorney, Agent, or Firm* — Dorsey & Whitney LLP

(57) ABSTRACT

The invention concerns a suborbital space traffic control system that comprises: a radar system configured to monitor a predetermined suborbital region and detect and track objects in the predetermined suborbital region. The objects include vehicles and space debris; and a suborbital space traffic monitoring system configured to: receive, from the radar system, tracking data related to the objects detected and tracked by the radar system; monitor, on the basis of the tracking data, trajectories of the objects in the predetermined suborbital region using one or more predetermined machine-
(Continued)

learning techniques to detect potentially hazardous situations for the vehicles in the predetermined suborbital region; and, if it detects a potentially hazardous situation for one or more given vehicles, transmit corresponding alarm messages to the given vehicle(s).

9 Claims, 5 Drawing Sheets

(51) Int. Cl.
    *B64G 3/00*           (2006.01)
    *G01S 13/72*         (2006.01)
    *G01S 13/933*       (2020.01)
    *G08G 5/00*           (2006.01)

(52) U.S. Cl.
    CPC .......... *G01S 13/933* (2020.01); *G08G 5/0008* (2013.01); *G08G 5/0021* (2013.01); *G08G 5/0043* (2013.01)

(56) References Cited

U.S. PATENT DOCUMENTS

| | | | |
|---|---|---|---|
| 7,383,124 B1* | 6/2008 | Vesel | G01S 13/765 701/13 |
| 7,570,214 B2* | 8/2009 | Smith | G01S 13/78 342/451 |
| 8,130,135 B2* | 3/2012 | Donovan | G08G 5/045 342/36 |
| 8,288,696 B1* | 10/2012 | Boka | F42B 15/01 342/61 |
| 8,380,367 B2* | 2/2013 | Schultz | G01C 21/3826 701/16 |
| 8,963,765 B1* | 2/2015 | Pedersen | G01S 7/41 342/13 |
| 8,981,989 B2* | 3/2015 | Gould | H01Q 25/007 342/146 |
| 9,140,784 B1* | 9/2015 | Friesel | F41H 11/00 |
| 9,207,049 B2* | 12/2015 | Rovinsky | F41G 7/303 |
| 9,225,070 B1* | 12/2015 | Zeweri | H01Q 21/24 |
| 9,250,043 B1* | 2/2016 | Block | G01S 7/003 |
| 9,292,792 B1* | 3/2016 | Pedersen | G06F 18/24155 |
| 9,586,704 B2 | 3/2017 | Nikolaev et al. | |
| 9,824,593 B1* | 11/2017 | Kronfeld | G01S 13/953 |
| 10,228,689 B2* | 3/2019 | Kolanek | G01S 13/883 |
| 10,302,759 B1* | 5/2019 | Arteaga | G08G 5/0082 |
| 10,309,784 B2* | 6/2019 | Bageshwar | G01S 13/86 |
| 10,605,607 B2* | 3/2020 | Bageshwar | G01B 21/16 |
| 10,650,688 B1* | 5/2020 | DeRoche | G08G 5/0026 |
| 10,692,389 B2* | 6/2020 | Fine | G08G 5/0069 |
| 10,725,169 B2* | 7/2020 | Goossen | G01S 13/765 |
| 10,982,935 B2* | 4/2021 | Sharpin | F42B 15/01 |
| 10,994,842 B1* | 5/2021 | Skylus | B64D 5/00 |
| 11,037,453 B2* | 6/2021 | Dawson-Townsend | G05D 1/46 |
| 11,041,950 B2* | 6/2021 | Troxel | G01S 13/767 |
| 11,073,622 B2* | 7/2021 | Cohen | G01S 19/425 |
| 11,175,142 B2* | 11/2021 | Bageshwar | G01S 13/726 |
| 2003/0093187 A1* | 5/2003 | Walker | B64D 45/0059 701/1 |
| 2003/0200024 A1* | 10/2003 | Poreda | G08G 5/025 342/36 |
| 2004/0075605 A1* | 4/2004 | Bradford | G01S 13/878 342/96 |
| 2005/0156777 A1* | 7/2005 | King | G08G 5/0021 342/29 |
| 2005/0187677 A1* | 8/2005 | Walker | B64C 13/20 701/16 |
| 2007/0252760 A1* | 11/2007 | Smith | G01S 11/02 342/451 |
| 2008/0111731 A1* | 5/2008 | Hubbard | G01S 13/872 342/160 |
| 2011/0015852 A1* | 1/2011 | Blomenhofer | G08G 5/0052 701/120 |
| 2011/0057830 A1* | 3/2011 | Sampigethaya | G01S 5/0072 342/36 |
| 2011/0169684 A1* | 7/2011 | Margolin | G01S 13/003 342/30 |
| 2013/0050024 A1* | 2/2013 | Barott | G01S 13/003 342/454 |
| 2013/0147652 A1* | 6/2013 | Haque | G08G 5/0013 342/21 |
| 2013/0306799 A1* | 11/2013 | Gregory | B64G 1/242 244/158.6 |
| 2015/0203218 A1* | 7/2015 | Fattori Martegani | G01M 5/0033 340/963 |
| 2015/0228196 A1* | 8/2015 | Sampigethaya | G08G 5/0034 701/120 |
| 2015/0355324 A1* | 12/2015 | Minear | G01S 13/93 342/146 |
| 2016/0011318 A1* | 1/2016 | Cohen | G01S 19/05 342/357.68 |
| 2016/0196754 A1* | 7/2016 | Surace | G08G 5/0082 701/117 |
| 2016/0275801 A1* | 9/2016 | Kopardekar | G08G 5/0082 |
| 2017/0069214 A1* | 3/2017 | Dupray | G08G 5/0008 |
| 2017/0285158 A1* | 10/2017 | Halbert | G01S 7/414 |
| 2018/0061252 A1* | 3/2018 | Feng | G01S 13/878 |
| 2018/0172797 A1* | 6/2018 | Hauswald | G01S 13/933 |
| 2018/0196435 A1* | 7/2018 | Kunzi | G08G 5/0013 |
| 2018/0199357 A1* | 7/2018 | Sundararaj | G08G 5/0013 |
| 2018/0225976 A1* | 8/2018 | Rinehart | G06N 7/01 |
| 2018/0227041 A1* | 8/2018 | Alminde | G01S 5/0009 |
| 2018/0233054 A1* | 8/2018 | Woon | G08G 5/0056 |
| 2018/0246200 A1* | 8/2018 | Goossen | G01S 19/03 |
| 2018/0246205 A1* | 8/2018 | Surace | G01S 13/953 |
| 2018/0299530 A1* | 10/2018 | Polynin | G08G 5/0013 |
| 2019/0005828 A1* | 1/2019 | Costas | G05D 1/101 |
| 2019/0019423 A1* | 1/2019 | Choi | G05D 1/0088 |
| 2019/0042748 A1* | 2/2019 | Shabtai | G06N 20/00 |
| 2019/0050136 A1* | 2/2019 | Alfano | B64G 99/00 |
| 2019/0162841 A1* | 5/2019 | Peckham | G01S 5/0027 |
| 2019/0213891 A1* | 7/2019 | Snyder | G08G 5/0013 |
| 2019/0213894 A1* | 7/2019 | Colligan | G08G 5/0082 |
| 2019/0355264 A1* | 11/2019 | Dolan | H04B 7/18508 |
| 2019/0357077 A1* | 11/2019 | Baker | G08G 5/0078 |
| 2020/0118451 A1* | 4/2020 | Dawson-Townsend | G06V 20/10 |
| 2020/0166956 A1* | 5/2020 | Stoschek | G01S 7/4802 |
| 2021/0116558 A1* | 4/2021 | Chan | G08G 3/00 |
| 2021/0358311 A1* | 11/2021 | Tantardini | G05D 1/104 |
| 2022/0159544 A1* | 5/2022 | Gupta | H04W 72/52 |
| 2022/0371755 A1* | 11/2022 | Mukae | G06N 20/00 |
| 2023/0217345 A1* | 7/2023 | Gupta | H04B 7/18521 455/9 |

FOREIGN PATENT DOCUMENTS

| | | |
|---|---|---|
| CN | 107529385 B | 2/2013 |
| CN | 108226888 A | 6/2018 |
| WO | 2018091607 A1 | 5/2018 |
| WO | 2018174822 A1 | 9/2018 |

OTHER PUBLICATIONS

R. Jain, F. Templin and Kwong-Sang Yin, "Analysis of L-Band Digital Aeronautical Communication Systems: L-DACS1 and L-DACS2," 2011 Aerospace Conference, Big Sky, MT, USA, 2011, pp. 1-10, doi: 10.1109/AERO.2011.5747378.*

A. Bettray, O. Litschke and L. Baggen, "Multi-beam antenna for space-based ADS-B," 2013 IEEE International Symposium on Phased Array Systems and Technology, Waltham, MA, USA, 2013, pp. 227-231, doi: 10.1109/ARRAY.2013.6731832.*

Joseph A. Haimerl, Gregory P. Fonder, "Space Fence System Overview," Proceedings of the 16th AMOS (Advanced Maui Optical and Space Surveillance Technology Conference), Maui, Hawaii, USA, Sep. 15-18, 2015, pp. 1-11).*

(56) References Cited

OTHER PUBLICATIONS

International Preliminary Report on Patentability (IPRP) received in PCT/IB2019/060247 dated Feb. 26, 2021.
International Search Report and Written Opinion received in PCT Application No. PCT/IB2019/060247 dated Mar. 18, 2020.
Written Opinion received in PCT/IB2019/060247 dated Oct. 20, 2020.
Dastner, Kaeye et al., "Classification of Military Aircraft in Real-time Radar Systems based on Supervised Machine Learning with Labelled ADS-B Data", 2018 Sensor Data Fusion: Trends, Solutions, Applications (SDF), IEEE, Oct. 9, 2018 (Oct. 9, 2018), pp. 1-6, XP033457141, DOI: 10.1109/SDF.2018.8547077 [retrieved on Nov. 26, 2018].
Duan, Pengfei et al., "ADS-B feasibility study for commercial space flight operations", Digital Avionics Systems Conference (DASC), 2010 IEEE/AIAA 29th, IEEE, Piscataway, NJ, USA, Oct. 3, 2010 (Oct. 3, 2010), pp. 3.A.1-1, XP031816268, ISBN: 978-1-4244-6616-0.
Manesh, Mohsen R. et al., "Analysis of vulnerabilities, attacks, countermeasures and overall risk of the Automatic Dependent Surveillance-Broadcast (ADS-B) system", International Journal on Critical Infrastructure Protection, vol. 19, Oct. 31, 2017 (Oct. 31, 2017), pp. 16-31, XP085267957, ISSN: 1874-5482, DOI: 10.1016/J.IJCIP.2017.10.002 Section 4.2.5: Data Fusion.
Shakeri, Reza et al., "Design Challenges of Multi-UAV Systems in Cyber-Physical Applications: A Comprehensive Survey, and Future Directions", arxiv.org, Cornell University Library, 201 Olin Library Cornell University Ithaca, NY 14853, Oct. 23, 2018 (Oct. 23, 2018), XP081417582.

\* cited by examiner

SUBORBITAL SPACE TRAFFIC CONTROL SYSTEM WITH RADAR SYSTEM AND ADS-B RECEIVER

CROSS-REFERENCE TO RELATED APPLICATIONS

This patent application is a U.S. National Stage Application of PCT Application No. PCT/IB2019/060247 filed Nov. 27, 2019, which claims priority from European patent application no. 18425087.6 filed on Nov. 27, 2018 and Italian patent application no. 102019000021105 filed on Nov. 13, 2019, the entire disclosures of which is are incorporated herein by reference.

TECHNICAL FIELD OF INVENTION

The present invention relates, in general, to a system for monitoring a predetermined suborbital region conveniently comprised between approximately 20/22 km and approximately 120/150 km from the earth's surface (preferably, between flight level (FL) 650 and approximately 150 km from the earth's surface) and, in particular, to a system for monitoring objects in said suborbital region and to detect potentially hazardous situations for said objects (e.g. situations of potential collision between said objects). More specifically, the present invention concerns a suborbital space traffic control system.

STATE OF THE ART

As is known, a suborbital space flight (also simply referred to as a suborbital flight) is a space flight where the space vehicle (e.g. a spaceplane) reaches space with a trajectory that intersects the atmosphere (or, more in general, the surface of the gravitational body from which it left), without completing a complete orbital revolution.

Currently, experimental activities in HOTOL (HOrizontal Take-Off and Landing) suborbital flights are in progress, for example, from Spaceport America located in New Mexico in the USA (while in Italy, the definition of the relevant regulations is underway in order to be able to conduct the first experimental suborbital flights).

With regard to this, FIG. 1 shows, very schematically, an example of a HOTOL suborbital flight. In particular, FIG. 1 shows a trajectory (indicated as a whole by 11) followed by a horizontal take-off and landing spaceplane (not shown) that takes off from a spaceport 12, reaches space beyond 100 km from earth (for example, reaching an altitude of approximately 110 km with zero gravity), and then returns to earth, landing at the spaceport 12. In addition, FIG. 1 also shows an example of segregated airspace 13 associated with the spaceport 12 for conducting HOTOL suborbital flights.

As is known, alternative solutions can be based on the use of two-stage systems, in which a main aircraft that transports a spaceplane takes off and reaches a predetermined altitude (e.g. approximately 15 km). The spaceplane is then released/uncoupled and can thus autonomously reach space beyond the 100 km altitude, and then re-enter (for example, by gliding) the spaceport of departure.

In addition, further solutions can be conveniently based on vertical take-off and landing (e.g. based on the use of Vertical Take-off, Vertical Landing (VTVL) rockets).

Looking ahead, suborbital flights can have numerous applications. For example, neglecting the initial application focused on "space tourism" with take-off and landing at the same spaceport, a quite interesting application concerns the possibility of taking off from one spaceport A and then landing at a spaceport B, with incredible potentialities, such as a drastic reduction of traditional flight times (for example, a flight from Rome to New York of this type might last around one hour).

In addition, a further application relates to the manufacture of low-cost launch vehicles for microsatellites.

On the other hand, the suborbital flight sector could also be advantageously exploited for:
  scientific experiments (e.g. in life sciences in microgravity, physical sciences in microgravity, aero-medical sciences, health physics, Earth sciences, etc.); and
  test and/or training activities (for example, for testing devices intended for space use and/or for training astronauts).

Unfortunately, as can be easily guessed, the introduction of suborbital space flight could give rise to many risks in terms of safety, both for the actual suborbital flights and for traditional air traffic and the population (for example, in the event of accidents and/or collisions). With regard to this, it is important to note that no systems currently exist that allow limiting these risks, nor authorities/agencies delegated to controlling suborbital flights. In fact, until now test missions have always been autonomously managed and controlled by the companies responsible for these missions, without control by third-party agencies/systems. For the future, an external control for this type of flight will certainly be necessary, as well as coordination between the various operators working in this sector (and also with the traditional air traffic operators).

On the other hand, it should be remembered that nowadays space debris represents a serious safety risk for traditional plane flights, for the ground infrastructures and for the population, while in the near future it could also represent a risk for suborbital space flights.

Various solutions have thus been proposed in recent years for the detection, tracking and monitoring of this debris. For example, solutions of this type are set forth in:
  U.S. Pat. No. 9,586,704 B2, which describes a system for modelling and simulating the propagation of space debris in order to predict potential collisions between space objects;
  CN106507959B, which describes a two-dimensional array ground radar system for the detection of space debris;
  CN107529385B, which describes another radar solution for the detection of space debris and for the generation of early warnings;
  CN102042820A, which describes a system for the detection of small pieces of space debris based on spectroscopy; and
  CN108226888A, which describes a method for the detection of multiple space targets (e.g. space debris) based on synthetic aperture imaging.

OBJECT AND SUMMARY OF THE INVENTION

In light of what has previously been explained, the Applicant has felt the need to carry out in-depth research in order to develop an innovative system that would enable monitoring and controlling suborbital space flights in an extremely reliable manner by reducing the associated risks, in this way arriving at the present invention.

Thus, the object of the present invention is to provide a system able to monitor and control suborbital space traffic in an extremely reliable manner, thereby reducing the associated risks.

This and other objects are achieved by the present invention in so far as it relates to a suborbital space traffic control system, as defined in the appended claims.

In particular, the present invention concerns a suborbital space traffic control system that comprises:
- a radar system configured to
  - monitor a predetermined suborbital region and
  - detect and track objects present in said predetermined suborbital region, wherein said objects include vehicles and space debris; and
- a suborbital space traffic monitoring system configured to
  - receive, from the radar system, tracking data related to the objects detected and tracked by said radar system,
  - monitor, based on the tracking data, trajectories of the objects in the predetermined suborbital region by using one or more predetermined machine-learning techniques to detect potentially hazardous situations for the vehicles in said predetermined suborbital region and,
  - if a potentially hazardous situation for one or more given vehicles is detected, transmit corresponding alarm messages to said given vehicle(s).

In detail, said radar system includes:
- a primary radar sensor equipped with an electronically scanned array antenna;
- an ADS-B receiver based on Automatic Dependent Surveillance-Broadcast technology; and
- a radar processing unit, which is connected to the primary radar sensor and to the ADS-B receiver to receive data therefrom, and configured to
  - detect and track objects in the predetermined suborbital region on the basis of the data received from said primary radar sensor and from said ADS-B receiver,
  - generate tracking data related to said detected and tracked objects, and
  - supply the suborbital space traffic monitoring system with said tracking data.

BRIEF DESCRIPTION OF THE DRAWINGS

For a better understanding of the present invention, some preferred embodiments, provided by way of non-limitative example, will now be described with reference to the accompanying drawings (not to scale), in which.

DETAILED DESCRIPTION OF PREFERRED EMBODIMENTS OF THE INVENTION

The following description is provided to enable an expert in the field to embody and use the invention. Various modifications to the embodiments will be immediately obvious to experts and the generic principles described herein could be applied to other embodiments and applications without, however, departing from the scope of the present invention, as defined in the appended claims.

Figure 1:
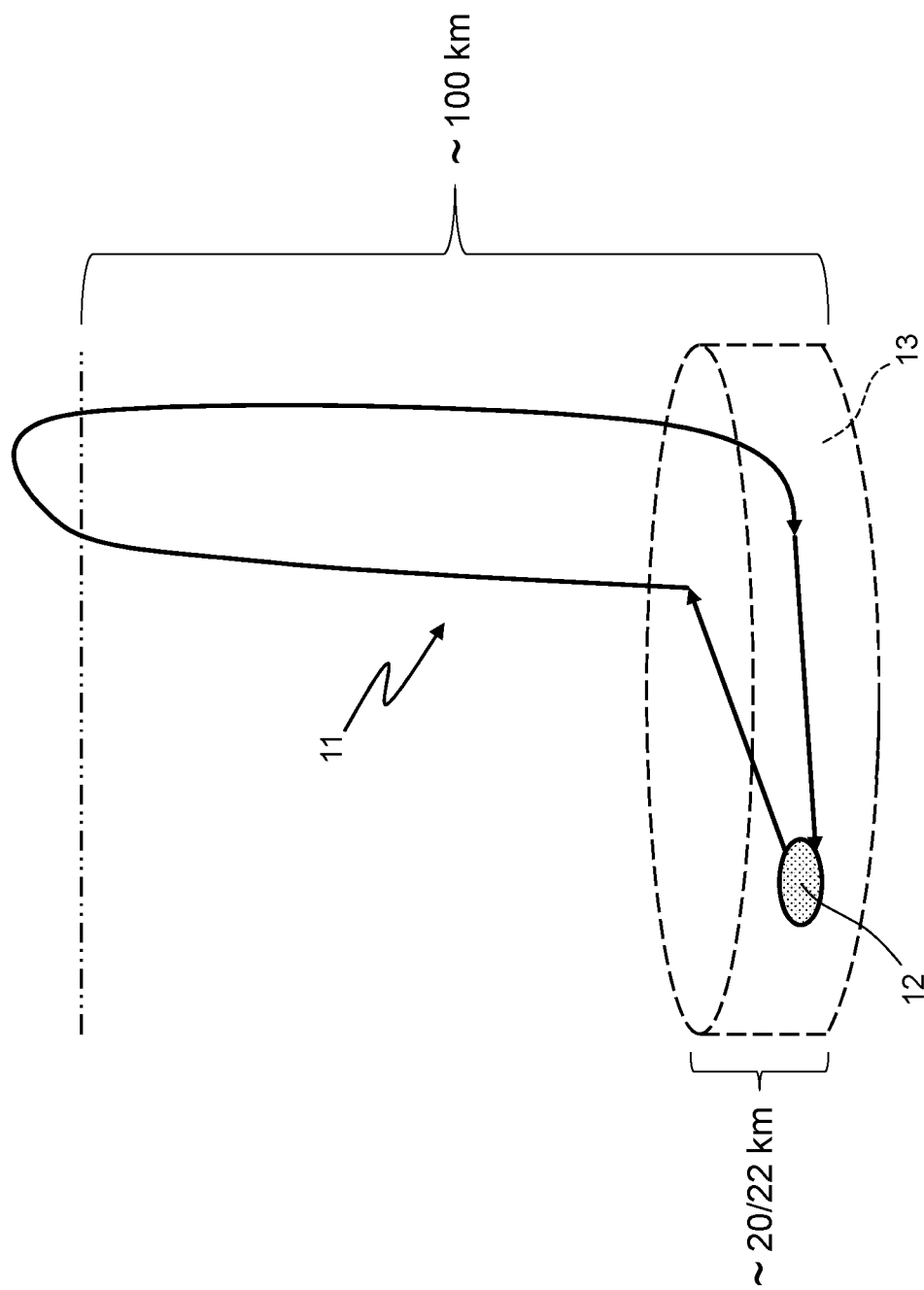
FIG. 1 schematically shows an example of HOTOL suborbital space flight.
Figure 2:
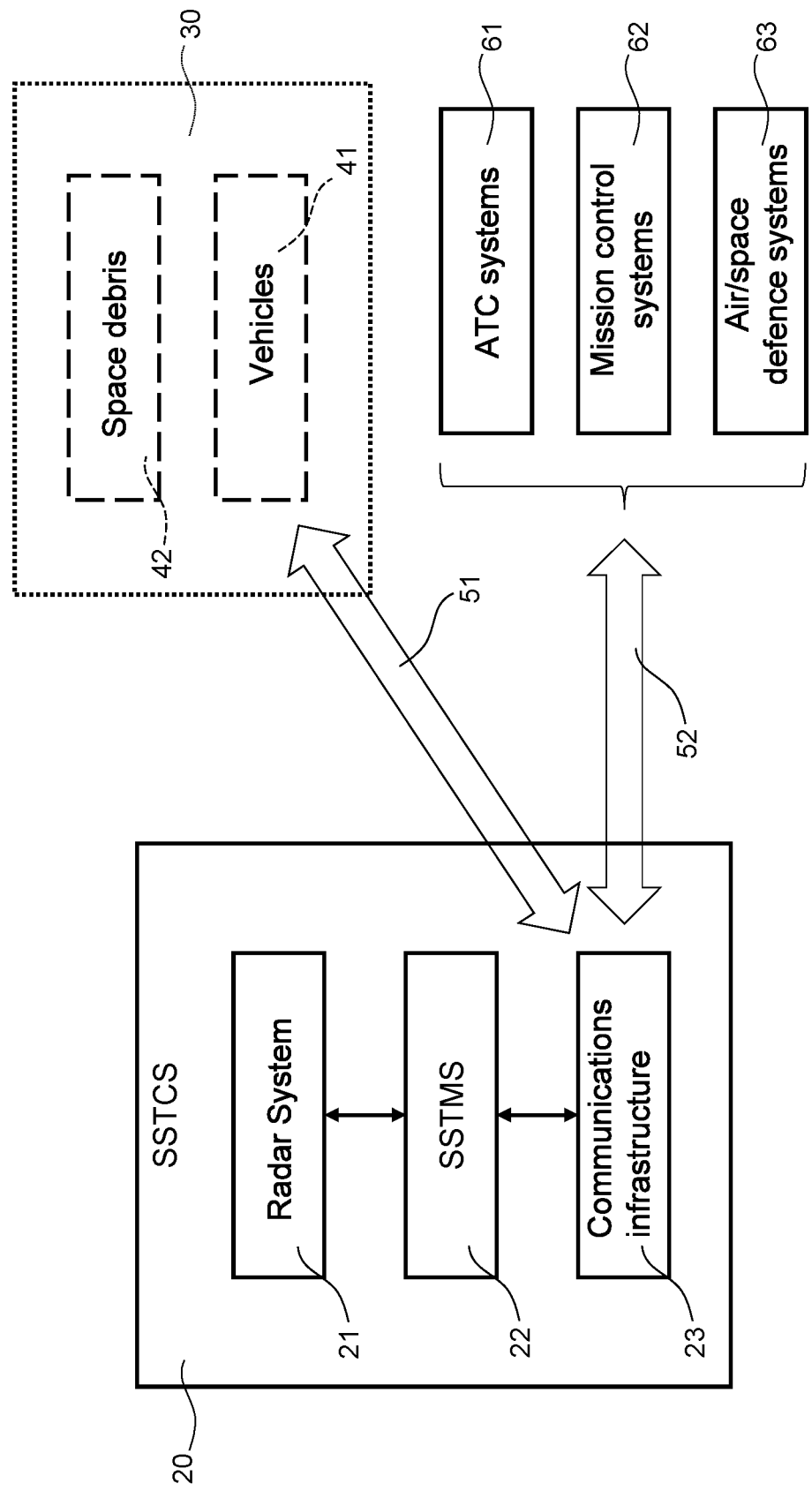
FIG. 2 schematically shows a suborbital space traffic control system according to a preferred embodiment of the present invention.

FIG. 2 schematically shows a suborbital space traffic control system (indicated as a whole by 20) according to a preferred (but absolutely non-limitative and non-binding) embodiment of the present invention. In particular, FIG. 2 shows (by means of a functional block diagram) a high-level architecture of the Suborbital Space Traffic Control System (SSTCS) 20.

In detail, said SSTCS 20 includes:
- a radar system 21 configured to
  - monitor a predetermined suborbital region 30 (preferably, said predetermined suborbital region 30 is comprised between a first predetermined altitude of approximately 20/22 km and a second predetermined altitude of approximately 120/150 km from the earth's surface; more preferably, said predetermined suborbital region 30 is comprised between the flight level (FL) 650 and approximately 150 km from the earth's surface), and
  - detect and track objects present (e.g. transiting) in said predetermined suborbital region 30, wherein said objects include vehicles 41 (e.g. spaceplanes, rockets, launch vehicles, aerostats, etc.) and space debris 42;
- a Suborbital Space Traffic Monitoring System (SSTMS) 22 configured to
  - receive, from the radar system 21, tracking data related to the objects detected and tracked by said radar system 21,
  - monitor, based on the tracking data, trajectories of the objects in the predetermined suborbital region 30 by using one or more predetermined machine-learning techniques, preferably one or more predetermined deep-learning techniques, to detect potentially hazardous situations for the vehicles 41 in said predetermined suborbital region 30 (e.g. potential collision situations) and,
  - if said SSTMS 22 detects a potentially hazardous situation for one or more given vehicles 41, transmit corresponding alarm messages to said given vehicle(s) 41; and
- a communications infrastructure 23 configured to allow said SSTMS 22 to carry out
  - ground-air and air-ground communications 51 with the vehicles 41 in said predetermined suborbital region 30 and
  - ground-ground communications 52 with systems for Air Traffic Control (ATC) 61 and/or other systems (e.g. mission control systems 62 for suborbital space flights, air/space defence systems 63, etc.).

Conveniently, said SSTMS 22 is configured to monitor the trajectories of the objects in the predetermined suborbital region 30 not only on the basis of the tracking data provided by the radar system 21, but also on the basis of data received from external systems, such as satellite tracking systems and/or anti-ballistic missile radar systems.

Figure 3:
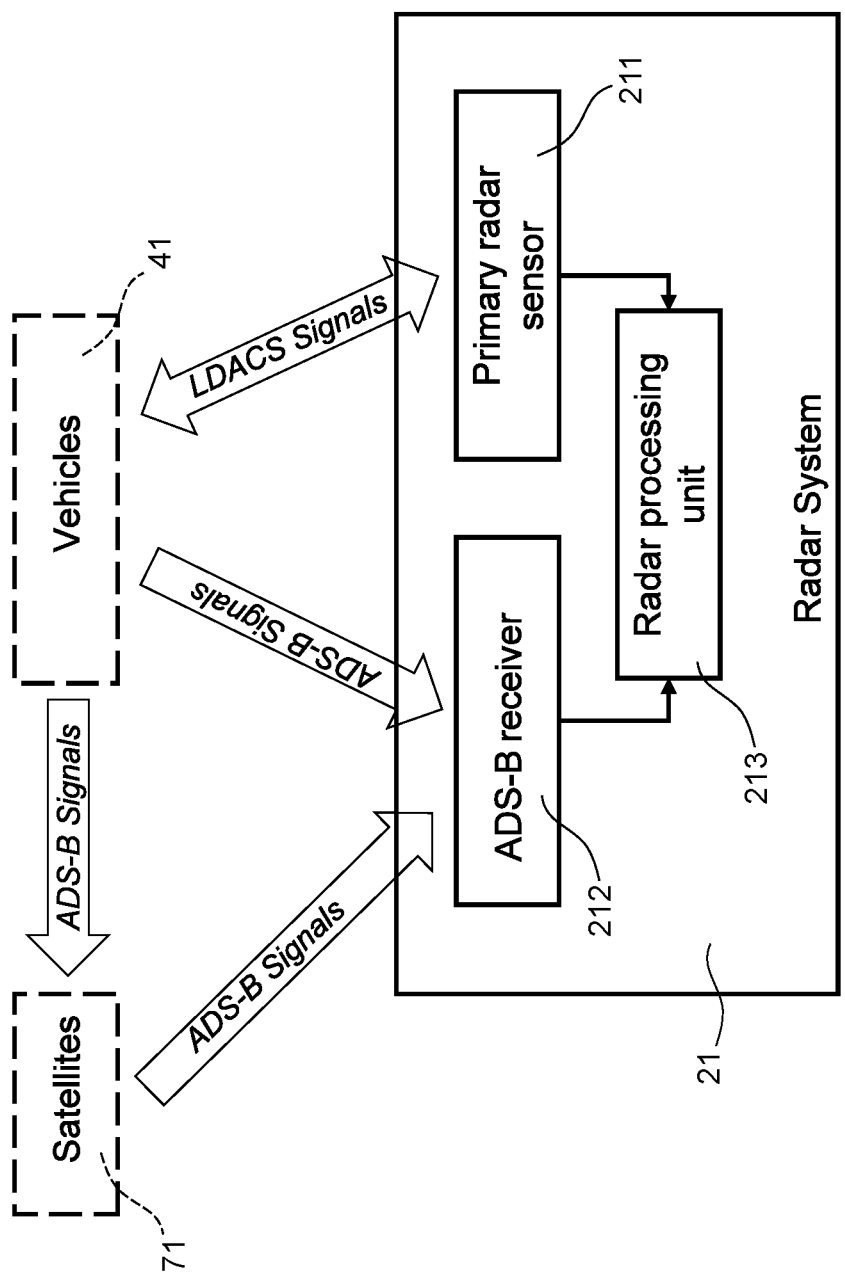
FIG. 3 shows a radar system of the suborbital space traffic control system of FIG. 2 in greater detail.

FIG. 3 shows the radar system 21 in greater detail, the system including:
- at least one primary radar sensor 211 equipped with an electronically scanned array antenna;
- at least one receiver based on Automatic Dependent Surveillance-Broadcast (ADS-B) technology 212 (hereinafter referred to as the "ADS-B receiver" for brevity); and a radar processing unit 213, which is connected to the primary radar sensor 211 and to the ADS-B receiver 212 to receive respective data therefrom, and is configured to detect and track the objects in the predetermined suborbital region 30 on the basis of the data received from said primary radar sensor 211 and said ADS-B receiver 212, generate corresponding tracking data related to said detected and tracked objects, and supply said tracking data to the SSTMS 22.

Preferably, said SSTMS 22 is configured to communicate with the vehicles 41 in the predetermined suborbital region 30 (for example, to transmit data and/or information to the latter—e.g. alarm messages) by means of the primary radar sensor 211 (conveniently, by using a technology based on/derived from LDACS (L-band Digital Aeronautical Communication System)). In this way, the primary radar sensor 211 provides the target detection and tracking functionality typical of radar, and also a two-way communications functionality with the vehicles 41 in the predetermined suborbital region 30.

Conveniently, the ADS-B receiver 212 is configured to receive ADS-B signals directly from the vehicles 41 in the predetermined suborbital region 30 and/or via one or more satellites 71.

Preferably, if said SSTMS 22 detects, on the basis of the monitored trajectories, a potential collision situation between two or more given vehicles 41 in the predetermined suborbital region 30 or between at least one piece of space debris 42 and at least one given vehicle 41 in the predetermined suborbital region 30, it is configured to transmit a corresponding alarm message to the given vehicle(s) 41 (and, conveniently, also to one or more ATC systems 61 and/or one or more mission control systems 62 and/or one or more air/space defence systems 63, etc.).

More preferably, if said SSTMS 22 detects a collision between two or more given vehicles 41 in the predetermined suborbital region 30 or between at least one piece of space debris 42 and at least one given vehicle 41 in the predetermined suborbital region 30, or if it detects an explosion of a given vehicle 41 in the predetermined suborbital region 30, it is configured to operate the primary radar sensor 211 to detect and track debris produced by said collision/explosion and monitor trajectories of said debris produced by said collision/explosion using the predetermined machine-learning technique(s) (preferably, the predetermined deep-learning technique(s)) to detect hazardous situations caused by said debris in the predetermined suborbital region 30 and/or in one or more underlying airspaces and/or on the earth's surface.

Figure 4:
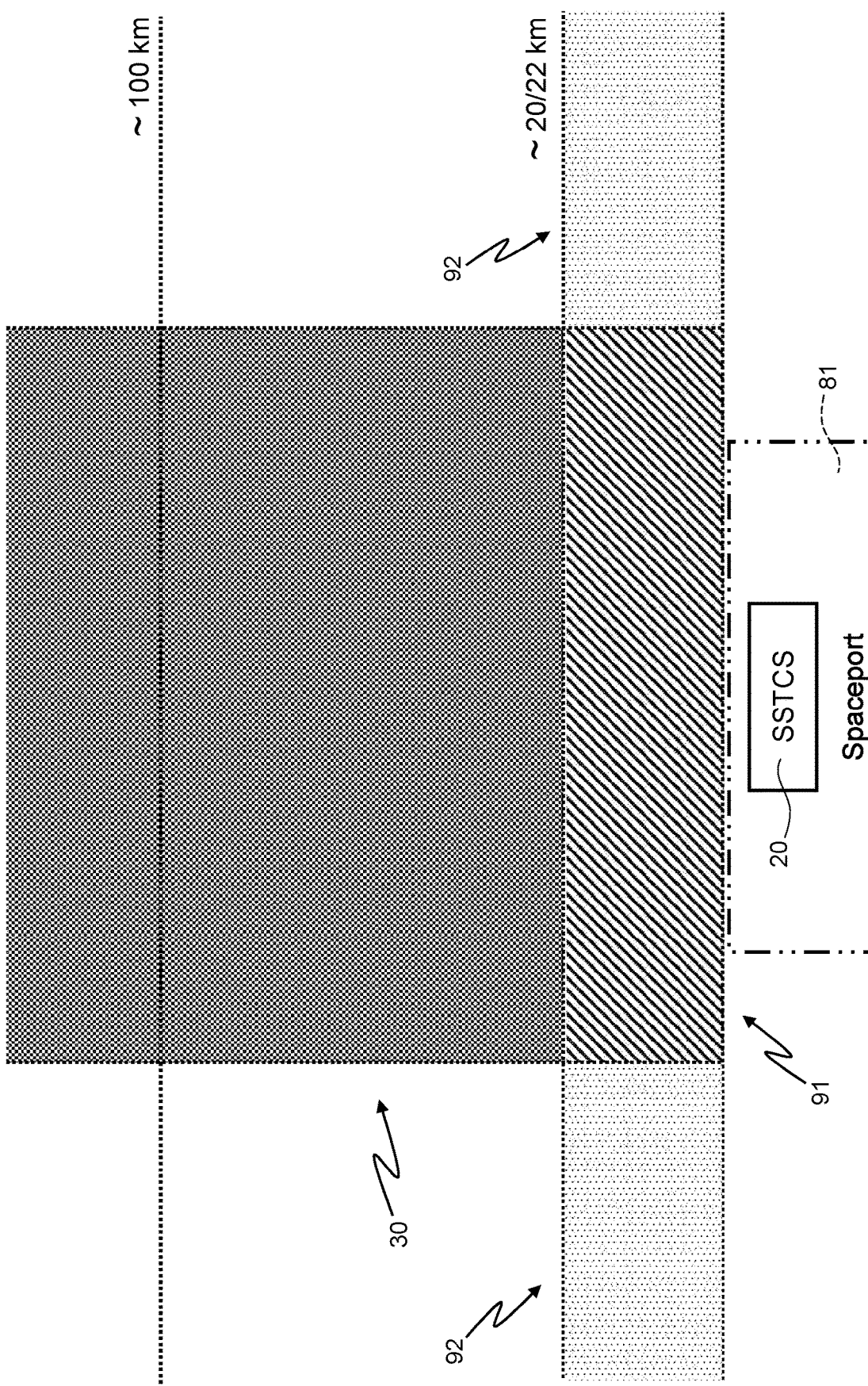
FIG. 4 schematically shows the installation of the suborbital space traffic control system of FIG. 2 at a spaceport.

Conveniently, said SSTCS 20 is installed at a spaceport. With regard to this, FIG. 4 schematically shows a spaceport 81 equipped with said SSTCS 20 for monitoring the predetermined suborbital region 30. In addition, FIG. 4 also shows a segregated airspace region 91 that extends between the earth's surface (in particular, between said spaceport 81) and the predetermined suborbital region 30. Only vehicles 41 that take off from the spaceport 81 to reach the predetermined suborbital region 30 and vice versa may transit in said segregated airspace region 91, while this is prohibited for traditional air traffic.

Preferably, said SSTMS 22 is also configured to:

operate the primary radar sensor 211 for tracking aircrafts in airspaces 92 adjacent to the segregated airspace region 91;

monitor trajectories of said aircrafts using the predetermined machine-learning technique(s) (preferably, the predetermined deep-learning technique(s)) to detect potential collision situations between the vehicles 41 in the segregated airspace region 91 and aircrafts in the airspaces 92 adjacent to the segregated airspace region 91; and, if it detects a potential collision situation between a vehicle 41 in the segregated airspace region 91 and an aircraft in an airspace 92 adjacent to the segregated airspace region 91, transmit a corresponding alarm message to said vehicle 41 in the segregated airspace region 91 and to at least one ATC system 61 that controls said aircraft in said airspace 92 adjacent to the segregated airspace region 91.

In other words, the primary radar sensor 211 enables said SSTMS 22 to simultaneously carry out the control of the suborbital space traffic and the tracking of traditional aircraft flights with a critical trajectory. In fact, the use of an electronically scanned array antenna, with electronically controlled narrow and independent beams, allows dedicating some of these beams to the surveillance of traditional airspace, while the other beams are used for tracking/monitoring suborbital flights.

Conveniently, the vehicles 41 in the predetermined suborbital region 30 can comprise:

spaceplanes, rockets or more in general, vehicles for HOTOL and/or VTVL suborbital flights;

drones;

aerostats, for example dirigibles, airships and/or aerostatic balloons;

supersonic aircrafts;

launch vehicles;

re-entry vehicles and/or satellites;

etc.

In the light of what has previously been explained, the present invention originates from the Applicant's innovative idea of exploiting different technologies in a synergetic manner (for example, one or more sensors derived from the line of more advanced multi-function radars and integrated in an ad hoc control centre) to produce an extremely reliable and safe system for the control of suborbital space flights (or, more in general, for the monitoring of suborbital vehicles and space debris in the region comprised between approximately 20/22 km (or rather FL 650) and approximately 120/150 km from the earth's surface), as today there are still neither control systems nor controlling authorities/agencies.

In other words, the field of application of the present invention can be conveniently considered as the joining and integration of space traffic and air traffic control, in that area that still today is neither regulated nor monitored.

For a better understanding of the present invention, several preferred characteristics (even if absolutely non-limitative) of said SSTCS 20 will be described in detail below.

1. System Architecture

As previously described, in order to control suborbital space traffic, said SSTCS 20 is equipped with:

an electronically scanned primary radar sensor 211 that also enables two-way communications based on/derived from LDACS;

an additional surveillance subsystem of a secondary cooperative type, in the specific instance an ADS-B receiver 212 (configured to also receive ADS-B signals from satellites 71);

an SSTMS 22, conveniently of ATC/ATM (Air Traffic Management) origin, to enable a "seamless" transition between the traditional ATC systems 61 and the system according to the present invention; and a communications infrastructure 23 for ground-air and air-ground communications 51 and ground-ground communications 52 capable of conveniently exploiting current technologies for aeronautical communications (e.g. Very high frequency Data Link Mode 2—VDL2, Aeronautical Mobile Airport Communication System—AeroMACS, LDACS, etc.).

However, the following can also be conveniently provided in said SSTCS 20:

payload management via a SATCOM connection (i.e. satellite communications) and its developments; and integration of data supplied by other systems external to said SSTCS 20, such as satellite tracking systems and/or anti-ballistic missile radar systems.

The aforementioned characteristics are conveniently implemented in a system architecture in which:

said SSTMS 212 can be conveniently implemented in a control centre capable of providing the scenario and payload management on dedicated stations; and the communications infrastructure 23 is perfectly integrated into classic ATC communications.

Thanks to the present invention, the mission control systems 62 for suborbital space flights and the air/space defence systems 63 can conveniently receive Control Working Position (CWP) data similar to that of the controllers of said SSTCS 20—even if the stations of the mission control systems 62 and air/space defence systems 63 are simply watcher stations, not having the right to issue specific orders on the system (unless security override is given by the authorities—e.g. military authorities).

Obviously, in the event of onboard problems detected by to its own telemetry systems, a mission control system 62 could inform both the operator of the SSTCS 20 who controls the suborbital flight and the corresponding air/space defence system 63.

Conveniently, a CWP could also be provided in the cockpit of suborbital vehicles with the possibility of integrating the tracking data in the onboard Flight Management System (FMS). All of this allows a complete view of the reference scenario and of any risks related to debris and emergency situations that might jeopardise the mission.

Furthermore, in time, all of this would allow complete integration of the new SSTCS 20, reducing the ATC segregations to a minimum.

2. Radar System

Regarding the radar system 21, it is important to note that:

the primary radar sensor 211 can be conveniently designed with low-cost commercial choices (without needing ECCM or EPM parts namely Electronic Counter-Countermeasures/Electronic Protective Measures), but with similar functionality, in terms of tracking performance, to those intended for detecting satellites and tracking tactical ballistic missiles (TBMs); however, said primary radar sensor 211 could also be conveniently used as a transmitter of a bistatic system (for example, using the radio telescopes of the Italian National Institute of Astrophysics (INAF) as receivers, in a context of collaboration, integration and data merging with similar radars of the Italian Air Force's national network);

as previously explained, the primary radar sensor 211 is preferably also used for carrying out ground-air and air-ground communications based on/derived from LDACS;

the ADS-B receiver 212 conveniently has an omnidirectional antenna with a range of up to 250 NM (nautical miles) and with the ability to also receive ADS-B signals from satellites 71.

Conveniently, the radar system 21 can provide the tracking data to the SSTMS 22 in the form of ASTERIX (ATC international standard for radar data exchange) format tracks.

As previously explained, once received by said SSTMS 22, the tracking data can also be conveniently combined by the latter with further tracking data received from satellite tracking systems and/or anti-ballistic missile radar systems.

3. Suborbital Space Traffic Monitoring System (SSTMS)

The suborbital space traffic monitoring system (SSTMS) 22 represents an innovative control centre for suborbital space flights and for monitoring space debris and, conveniently not based on the enhancement of typical functions of air traffic control (ATC) and also able to integrate any data provided by external systems (e.g. satellite tracking systems and/or anti-ballistic missile radar systems).

Figure 5:
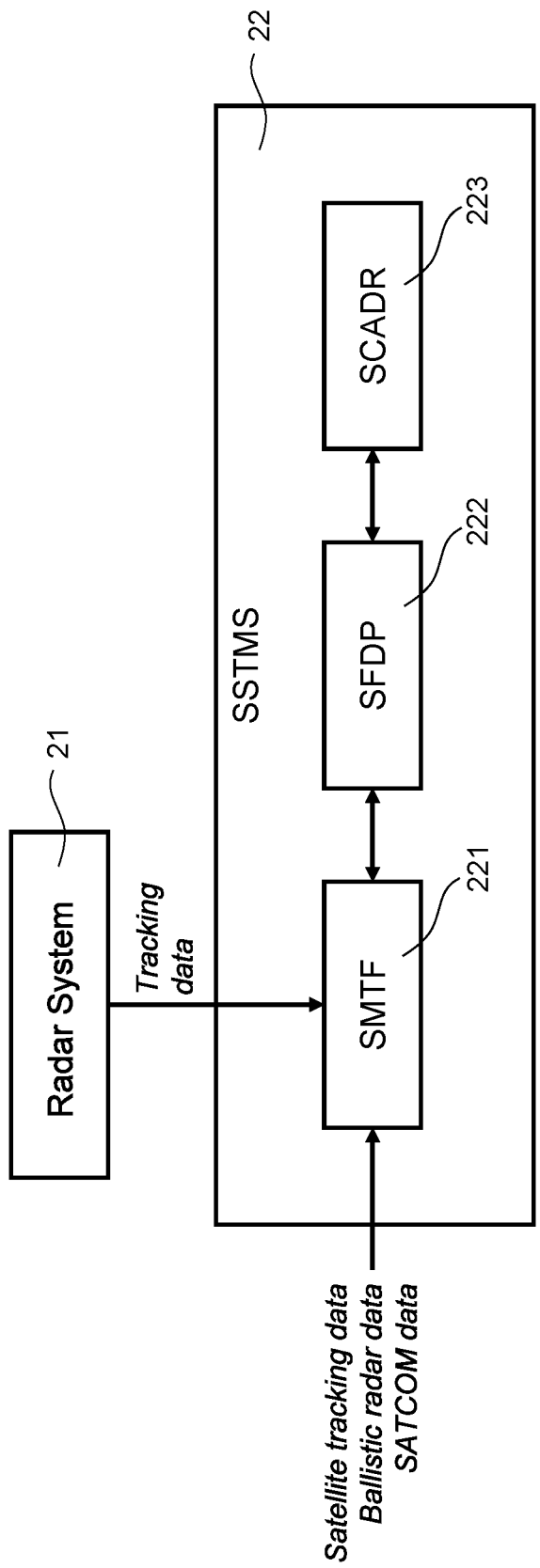
FIG. 5 schematically shows an example of architecture of a suborbital space traffic monitoring system of the suborbital space traffic control system of FIG. 2.

With regard to this, FIG. 5 schematically shows an example of an architecture utilizable for said SSTMS 22 according to a preferred (but absolutely non-limitative and non-binding) embodiment of the present invention. In particular, FIG. 5 shows (by means of a functional block diagram) a high-level architecture of said SSTMS 22.

In detail, as shown in FIG. 5, said SSTMS 22 is conveniently designed to implement the following functions derived from traditional ATC:

Space Multi Tracking Fusion (SMTF) 221, in which the tracks of the suborbital flights provided by the radar system 21 are conveniently enhanced with any other cooperative data originating from satellite control, exploiting SATCOM in the Ka and/or L bands with specific terminals on board the suborbital vehicle; in this way, there is the possibility to extract and/or manage any payload related to the mission;

Space Flight Data Processor (SFDP) 222—at altitudes below FL 650, departing flights from one or more spaceports can be controlled substantially like standard flights under Instrument Flight Rules (IFR), with minimal changes in the conventional ATC systems 61 and with opportune management of the segregated areas, i.e. Flexible Use of Airspace (FUA); however, once the altitude limit is reached, the tracks provided by the radar system 21 enable having a trajectory correlated with the specific flight plan of the suborbital flight;

Space Conflict Alert Detection and Resolution (SCADR) 223—also in this case, at altitudes below FL 650, the conflicts between suborbital flights and other IFR flights can be managed as normally happens in ATC with typical functions (i.e. Short-Term Conflict Alert—STCA, Medium-Term Conflict Detection—MTCD, etc.); however, above FL 650, the SCADR function 223 is activated, mainly for analysing the trajectories of space debris detected by the radar system 21 with respect to the planned trajectories and the aforesaid suborbital flights; furthermore, through dedicated algorithms, determined in the planning stage, the aborting of a suborbital space mission can also be decided; in addition, in the event of an explosion of a suborbital space vehicle with the consequent production of debris, there is the possibility of dynamically and flexibly managing the emergency in real-time in the underlying ATC area by configuring ad hoc segregated areas based on the positions and trajectories of this new debris detected and tracked by the radar system 21.

Preferably, the SCADR function 223 includes a comparison between the trajectories of the space debris and the trajectories of the suborbital vehicles, where the trajectories of the space debris and/or the suborbital vehicles are conveniently computed through one or more predetermined deep-learning techniques on the basis of historical track data (e.g. big data) archived in a strategic phase. This enables having greater accuracy in computing the trajectories and avoiding potential collisions.

Conveniently, there is an alignment between said SSTMS 22 and the ATC systems 61 that allows managing the suborbital regions as if they were sectors inside the Flight Information Regions (FIRs), even if they are actually regions at higher altitudes with boundaries defined by the suborbital space missions.

Conveniently, said SSTMS 22 is able to exchange data with other control centres, airports and stakeholders via System Wide Information Management (SWIM)/Aeronautical Message Handling System (AMHS).

Furthermore, as previously explained, by exploiting a proprietary connection based on/derived from LDACS (which the applicant has called "ENH LDACS"), said SSTMS 22 is able to distribute and integrate a CWP of the suborbital space type, with all its alerts, directly in the cockpit of suborbital vehicles. In this way, a pilot has a real-time representation of the trajectories of their suborbital vehicle and of any nearby space debris, as well as an indication of any alarms (for example, related to potential risks of collision) and/or suggested trajectories for the suborbital vehicle. All of this enables real-time coordination, with optimized emergency management, between the SSTCS 20, the mission control system 62 and the air/space defence system 63.

Conveniently, as previously explained, it is also possible to integrate the tracking data processed by the SSTMS 22 inside the onboard Flight Management System (FMS). This would enable, for example, an automatic change of course of the suborbital vehicle based on what is suggested by the SCADR function 223.

4. Integration Between SSTMS and ATC

As previously explained, the SSTMS 22 is conveniently designed so as enable an ATC scenario at higher flight levels integrated with the reference FIRs.

This allows complete interoperability and integration between current ATC systems 61 and the new SSTCS 20, whereby:

- in the new SSTCS 20 (in particular, in said SSTMS 22) it is possible to conveniently have flight plans that are completely aligned with those of the existing Area Control Centres (ACCs) and approach control (APP);
- it is possible to conveniently obtain "silent" transfer and coordination of control between the controllers of the ATC systems 61 and those of the SSTCS 20;
- the CWP can be conveniently configured to display suborbital objects (i.e. vehicles 41+space debris 42) and objects at lower altitudes (i.e. aircrafts) in the same radar image and to provide a single operating position also for the ATC control;
- the SSTCS 20 can conveniently offer a seamless transition between the presentation of suborbital data and traditional flight data due to an adaptive updating of the track symbols based on the type of sensors that contribute to their readings;
- CWP stations of the suborbital space type could be conveniently configured as additional CWP stations in ATC systems 61 for emergency management;
- the SSTCS 20 (and, in particular, the SSTMS 22) could be conveniently configured as the disaster recovery centre of a corresponding ATC system 61, having
  - physical separation between the places of installation,
  - complete alignment of tracks and flight plans between the two systems, and
  - CWP stations of the suborbital space type capable of recovering the AIR sectorization of the ATC centre.

5. Communications Infrastructure

As previously explained, the SSTCS 20 preferably comprises also the integration of an ad hoc communications infrastructure 23 inserted in the classic ATC communications scenario (e.g. VDL2) and its evolution (i.e. LDACS).

This thus conveniently gives a legitimate LDACS system perfectly integrated in the concept of Future Communication Infrastructure (FCI) contemplated in the ICAO (International Civil Aviation Organization) roadmaps, without of course leaving out voice-based communications with classic VHF (Very High Frequency) radio, and also satellite communications between the pilot, ANSP (Air Navigation Service Provider) and mission control centre. Everything is also conveniently integrated in the ground-ground communications 52 inside the spaceport 81, which could be managed through AeroMACS.

Furthermore, as previously explained, the electronically scanned array antenna (preferably planar) of the primary radar sensor 211 is conveniently designed to also support LDACS tracking and enable reaching altitudes up to 100-110 Km by latching into the primary radar tracking. Therefore, there is effectively an electronically scanned array antenna in the L Band both for surveillance and for high-altitude ground-air and air-ground communications 51. This allows having suborbital spatial CWP information in the cockpit of suborbital vehicles even at altitudes above 100 km.

6. Technical Advantages of the Invention and Final Observations

From the foregoing description, the innovative characteristics and technical advantages of the present invention are immediately evident to an expert in the field.

In this respect, it is first of all important to underline that the present invention enables making a completely autonomous system in terms of surveillance, tracking, control and communications, which is easily integrable with all the current ATC systems and airport systems installed around the world, and which is able to manage emergencies arising from the presence of space debris that might jeopardize suborbital spatial missions, as well as the presence of any debris produced by collisions and/or explosions.

In particular, the suborbital space traffic control system according to the present invention ensures an adequate level of safety both for suborbital flights and for the people and structures on the ground, as well as for all the other users of the underlying airspace and sea, even in the event of collisions or explosions of suborbital vehicles.

Regarding the future scenario with journeys from one spaceport A to another spaceport B, the present invention could be advantageously installed not just in (a few) specific spaceports, but in all the main aviation hubs.

In addition, it is worth noting that the present invention also allows gaining the following advantages:

- unlike the currently known solutions for monitoring space debris, which only contemplate the simulation of the trajectories of this debris (in order to predict the descent trajectory and possible area of the earth's surface affected by this falling debris), the present invention instead provides a real-time tracking of the trajectories of the space debris, as well as any debris produced by explosions or collisions, with evident advantages in terms of safety;

due to the real-time monitoring of space debris (or other objects in the suborbital space region of interest), the present invention enables avoiding the start or re-entry of a suborbital flight in cases where problems related to the presence of debris (or other objects) are detected or, more in general, enables programming suborbital flights with greater precision and safety, reducing the probability of false alarms of possible collision typical of forecasts/planning based on the "bulletin" service provided by government agencies in the USA (notoriously affected by significant long-term errors);

as repeatedly stressed in the foregoing, the present invention enables drastically reducing the risks of missions above FL 650 due to the real-time tracking of debris in the suborbital region of interest, with analysis of the decent trajectories and forecasting of the impact area, so as to alert and empty/evacuate any areas of airspace and/or the earth's surface affected by the falling debris; and the present invention represents an integrated solution that not only perfectly responds to the future scenario of suborbital flights, but also enables having a "seamless" transition between traditional ATC systems and the suborbital space traffic control system according to the present invention.

Finally, it is important to draw attention to some of the innovative characteristics of the present invention:

real-time control of suborbital flights and debris and/or objects at altitudes exceeding 20/22 km, i.e. FL 650;

traditional algorithms strengthened with deep-learning techniques applied to the trajectory analysis;

earlier and more reliable forecasts of the areas of impact;

automatic closing of underlying airspace by exploiting the strong integration with traditional ATC systems;

CWP (Control Working Position) of the suborbital space type installed in the cockpit of the suborbital vehicles for viewing a complete scenario in terms of position of the vehicle, surrounding traffic and any nearby debris, updated in real-time and transmitted from the ground system to the vehicle by exploiting one of the available bands of the primary radar sensor when it "illuminates" the vehicle (i.e. "ENH LDACS"); and automatic evaluation of the optimal course to follow based on the alarms signalled by the SSTMS, this also updated and transmitted in real-time on a service band of the primary radar sensor (i.e. "ENH LDACS").

In conclusion, it is important to note that, although the above-described invention makes particular reference to quite precise embodiments, it should not be considered limited to these embodiments, with all variants, modifications or simplifications covered by the appended claims falling within its scope.

The invention claimed is:

1. A suborbital space traffic control system, comprising:
a radar system configured to
monitor a predetermined suborbital region comprised between a first predetermined altitude of 20/22 km and a second predetermined altitude of 120/150 km from earth's surface, and
detect and track vehicles and space debris in said predetermined suborbital region;
a suborbital space traffic monitoring system; and
a communications infrastructure configured to allow the suborbital space traffic monitoring system to carry out ground-air and air-ground communications with the vehicles in the predetermined suborbital region, and
ground-ground communications with other ground systems;
wherein the radar system includes:
a primary radar sensor equipped with an electronically scanned array antenna;
an ADS-B receiver based on Automatic Dependent Surveillance-Broadcast technology; and
a radar processing unit, which is connected to the primary radar sensor and to the ADS-B receiver to receive data therefrom, and is configured to
detect and track the vehicles and the space debris in the predetermined suborbital region on the basis of the data received from said primary radar sensor and from said ADS-B receiver,
generate tracking data related to said detected and tracked vehicles and space debris, and
provide the suborbital space traffic monitoring system with said tracking data;
wherein said suborbital space traffic monitoring system is configured to:
monitor, on the basis of the tracking data received from the radar system, trajectories of the vehicles and of the space debris in the predetermined suborbital region by using one or more predetermined machine-learning techniques to detect
one or more potential collision situations between/among two or more of the vehicles in the predetermined suborbital region,
one or more potential collision situations between/among one or more pieces of the space debris and one or more of the vehicles in the predetermined suborbital region, and
one or more explosions of one or more vehicles in the predetermined suborbital region;
if it detects, on the basis of the monitored trajectories, a potential collision situation between/among two or more first vehicles in the predetermined suborbital region, transmit corresponding alarm messages to said first vehicles;
if it detects, on the basis of the monitored trajectories, a potential collision situation between/among one or more pieces of the space debris and one or more second vehicles in the predetermined suborbital region, transmit one or more corresponding alarm messages to said second vehicle(s);
if it detects a first collision between/among two or more third vehicles in the predetermined suborbital region,
operate the primary radar sensor to detect and track debris produced by said first collision, and
monitor trajectories of said debris produced by said first collision by using the predetermined machine-learning technique(s);
if it detects a second collision between/among one or more pieces of the space debris and one or more fourth vehicles in the predetermined suborbital region,
operate the primary radar sensor to detect and track debris produced by said second collision, and
monitor trajectories of said debris produced by said second collision by using the predetermined machine-learning technique(s);
if it detects an explosion of a fifth vehicle in the predetermined suborbital region,
operate the primary radar sensor to detect and track debris produced by said explosion, and monitor trajectories of said debris produced by said explosion by using the predetermined machine-learning technique(s);

communicate with the vehicles in the predetermined suborbital region through the primary radar sensor by using a technology based on/derived from L-band Digital Aeronautical Communication System technology; and provide payload management via a satellite connection, wherein a payload is extracted based on Ka bands, L bands, or a combination thereof from the satellite connection.

2. The suborbital space traffic control system of claim 1, wherein the predetermined suborbital region is comprised between flight level (FL) 650 and 150 km from earth's surface.

3. The suborbital space traffic control system according to claim 1, wherein said predetermined machine-learning technique(s) is/are predetermined deep-learning technique(s).

4. The suborbital space traffic control system according to claim 1, wherein the suborbital space traffic monitoring system is configured to monitor the trajectories of the vehicles and of the space debris in the predetermined suborbital region also on the basis of data received from one or more satellite tracking systems.

5. The suborbital space traffic control system according to claim 1, wherein the suborbital space traffic monitoring system is configured to monitor the trajectories of the vehicles and of the space debris in the predetermined suborbital region also on the basis of data received from one or more anti-ballistic missile radar systems.

6. The suborbital space traffic control system according to claim 1, wherein the ADS-B receiver is configured to receive ADS-B signals directly from the vehicles in the predetermined suborbital region.

7. The suborbital space traffic control system according to claim 1, wherein the ADS-B receiver is configured to receive ADS-B signals via one or more satellites.

8. The suborbital space traffic control system according to claim 1, wherein a segregated airspace region extends between earth's surface and the predetermined suborbital region, with only vehicles that are reaching, or that are coming from, said predetermined suborbital region being allowed to pass through said segregated airspace region;

wherein the suborbital space traffic monitoring system is configured to:

operate the primary radar sensor to track aircraft in airspaces adjacent to the segregated airspace region;

monitor trajectories of said aircraft by using the predetermined machine-learning technique(s) to detect potential collision situations between the vehicles in the segregated airspace region and the aircraft in the airspaces adjacent to the segregated airspace region; and, if it detects a potential collision situation between a vehicle in the segregated airspace region and an aircraft in an airspace adjacent to the segregated airspace region, transmit a corresponding alarm message to said vehicle in the segregated airspace region and to at least one air traffic control system that controls said aircraft in said airspace adjacent to the segregated airspace region.

9. The suborbital space traffic control system according to claim 1, wherein the electronically scanned array antenna is configured to emit electronically controlled narrow and independent beams, wherein a portion of the beams are used for surveillance of traditional airspace and a second portion of the beams are used for tracking and monitoring suborbital flights.

* * * * *